United States Patent [19]

Olson

[11] 4,224,657

[45] Sep. 23, 1980

[54] LIGHT ASSEMBLY FOR POSITIONING LIFT TRUCK LOAD-HANDLING DEVICE

[75] Inventor: John E. Olson, Portland, Oreg.

[73] Assignee: Cascade Corporation, Portland, Oreg.

[21] Appl. No.: 10,303

[22] Filed: Feb. 8, 1979

[51] Int. Cl.³ .............................................. B60Q 1/00

[52] U.S. Cl. ....................................... 362/67; 362/76; 37/120

[58] Field of Search ....................... 362/61, 66, 67, 68, 362/70, 71, 76; 340/21, 104; 414/281, 592; 37/118 R, 120, 121; 172/276

[56] References Cited

U.S. PATENT DOCUMENTS

| | | | |
|---|---|---|---|
| 1,859,349 | 5/1932 | Thibodeaux | 362/76 |
| 2,098,419 | 11/1937 | Handley | 362/76 |
| 3,934,134 | 1/1976 | Wassel | 362/66 |

*Primary Examiner*—Donald P. Walsh

*Attorney, Agent, or Firm*—Chernoff & Vilhauer

[57] ABSTRACT

A light assembly specially mounted upon a lift truck load carriage at a position adjacent the bottom thereof and rearwardly of the forward end a load fork or other similar forwardly-extending load-engaging member, for forwardly projecting a shadow of the load-engaging member to aid the lift truck operator in determining the position thereof relative to a vertical array of stacked loads such as in a warehouse. A transfer mechanism is provided wherein the light assembly is removably mounted upon the carriage and, when the carriage is lowered beyond a predetermined position relative to the mast, the light assembly is transferred from its removable mount on the carriage to a fixed mount on the mast so that it does not follow the carriage downwardly. Upon elevation of the carriage above the aforementioned position, a reverse transfer takes place whereby the light is retransferred from the mast to the carriage and thus follows the carriage upwardly. The light assembly projects light forwardly in a substantially horizontal direction when on the carriage, but assumes a downwardly-tilted attitude after is has been transferred to the mast.

18 Claims, 4 Drawing Figures

LIGHT ASSEMBLY FOR POSITIONING LIFT TRUCK LOAD-HANDLING DEVICE

BACKGROUND OF THE INVENTION

The invention relates to improvements in light assemblies for aiding a lift truck operator in positioning a load-handling device with respect to a load to be picked up, or with respect to the place where the load is to be deposited. More specifically, the assembly is useful in aiding the operator in accurately positioning a load-handling device vertically, particularly when the device is elevated above the operator. The assembly also provide a second function of providing general illumination for traveling or load handling when the load-handling device is in a lowered position.

In the past, lights have been mounted either atop a lift truck overhead guard or upon a lift truck load carriage to provide general illumination to aid a lift truck operator during traveling and during the manipulation of loads in dimly lit areas. While lights on the overhead guard provide sufficient illumination for lower positions of the load carriage, they are normally blocked by the load at intermediate elevations of the carriage and are ineffective when the carriage is in a high-lift position where the operator must be able to determine the relative elevation between the position of the load forks and the pallet cavities or other spaces into which the forks must be inserted. Even if the direction of such lights is controllable such that the light may be directed upwardly toward a high-lift position, or if illumination at the high-lift position is otherwise good due to effective ambient lighting, the operator still encounters great difficulty in accurately positioning the load forks vertically such that, when the lift truck is advanced toward a stack for engaging a particular load, the forks are at a proper elevation so as to slip into the pallet cavity or other space beneath a load. This is because the operator's line of sight with respect to the fork tips is at a steep upward angle making it difficult for him to gauge level relationships at a high elevation from a vantage point below. A similar problem exists with respect to depositing a load at an elevated position on a stack or storage rack.

Conversely, lights which are mounted on a lift truck carriage normally must be positioned at an elevation considerably above the forks to avoid damage to the lights from contact with the floor or other obstacles when the forks are in a lowered position. The necessity of elevating a carriage-mounted light above the forks results in the light being blocked by the load in many instances and therefore rendered ineffective.

Allen et al U.S. Pat. No. 3,122,957 discusses, in the text thereof, various prior types of devices utilized to indicate shelf height in those applications where storage racks are utilized, and in particular is directed to a photosensor assembly mounted on the load carriage which directs light against the storage racks and coordinates with reflectors mounted at predetermined positions on the storage rack to reflect the light back to a carriage-mounted photosensor which acts through a potentiometer to indicate to the lift truck operator the height of the forks relative to the rack-mounted reflectors. Aside from the complexity of such system, its usefulness is limited by the fact that is can be used only in a storage rack application where reflectors are mounted at predetermined locations on the rack. It is not versatile enough to be used, for example, in many conventional warehouse situations where there are no storage racks and loads are merely stacked atop one another separated by spacers defining openings into which the forks may be inserted and withdrawn.

SUMMARY OF THE PRESENT INVENTION

The present invention is directed to a light assembly for lift truck load-handling devices which overcomes all of the foregoing deficiencies of prior art light assemblies while performing a much more useful function. According to the present invention, the light assembly is mounted in a novel position on the vertically-movable load-handling device, normally a lift truck load carriage from which load-engaging members such as forks extend forwardly. Although the invention will be described with respect to load forks since this is the most common application, the invention would also be applicable to other types of load-engaging members such as clamp arms.

According to the present invention, the light assembly includes a light source which is mounted upon the load-handling device, usually the load carriage, at a position rearwardly of the forward end of the load fork or other load-engaging member and at a position adjacent to the bottom of the load-handling device at the same, or approximately the same, elevation as the load fork so as to project light forwardly in a direction in which a portion of the light is intercepted by the fork, thereby forwardly projecting a shadow of the fork. This unusually low placement of the light source has the important advantages of (a) making the shadow which is cast against the load stack accurately representative of the vertical elevation of the fork, which enables the operator to determine its relative elevation with respect to the stack when operating at substantial height, and (b) placing the light source generally where it will be permitted to project light forwardly despite the presence of the load, projecting the light below the level of the load and through the fork space in a supporting pallet if one is used. In cases where a load is present atop the forks, the light casts a shadow of the forward bottom edge of the load which is also accurately representative of the vertical elevation of the forks.

The unusually low position of the light source on the load-handling device requires that a portion thereof depend below the bottoms of the forks which, as stated in the preceding section, would normally present a danger of severe damage to the light source when the forks are lowered. However a further feature of the present invention not only prevents such damage, but also enables the light assembly to perform a second useful function when the forks are in a lowered position below the operator's line of sight where vertical elevation of the forks is relatively easy to determine and, in any case, a load would block the operator's view of the area illuminated by a low-position light. According to the present invention, a mechanism is provided wherein the light source is movably and detachably mounted on the carriage so as to permit upward movement of the light source with respect to the carriage. When the carriage is lowered below a predetermined elevation with respect to the lift truck mast a structure on the mast engages the light assembly, lifting it upwardly off of its detachable mount on the carriage and transferring it to the mast so that it does not follow the carriage downwardly. Thus the light remains at an elevated position on the mast where it cannot be damaged and, moreover, assumes an attitude tilted downwardly with respect to its attitude when mounted on the carriage so as to shine down in front of the truck and provide traveling illumination and aid the operator with respect to the manipulation of loads in the lower carriage positions, particularly in dimly lit areas.

Upon elevation of the carriage above a predetermined position with respect to the mast, a reverse transfer takes place whereby the light assembly is retransferred from the mast to the carriage and thus follows the carriage upwardly in its aforementioned position adjacent the bottom of the carriage.

Accordingly it is a primary objective of the present invention to provide a light assembly for a load-handling device for forwardly projecting a shadow of a load-engaging member, which shadow is substantially accurately indicative of the vertical elevation of the load-engaging member.

It is a further objective of the present invention to mount the light assembly on a load-handling device at a relatively low position adjacent to the bottom of the load-handling device so that the light assembly is effective to produce an accurate elevation-indicating shadow even while a load is supported by the load-handling device, such shadow in the latter case being representative of the elevation of the forward bottom edge of the load.

It is a further objective of the present invention to prevent damage to the light assembly when the load-handling device is fully or nearly fully lowered, despite the above-described low position of the light assembly relative to the load-handling device.

It is a further objective of the present invention to provide the light assembly with a different function when the load-handling device is below a predetermined elevation, i.e. providing forwardly and downwardly directed illumination for traveling and for the manipulation of the load-handling device to aid the visibility of the lift truck operator in dimly lit areas.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 1:
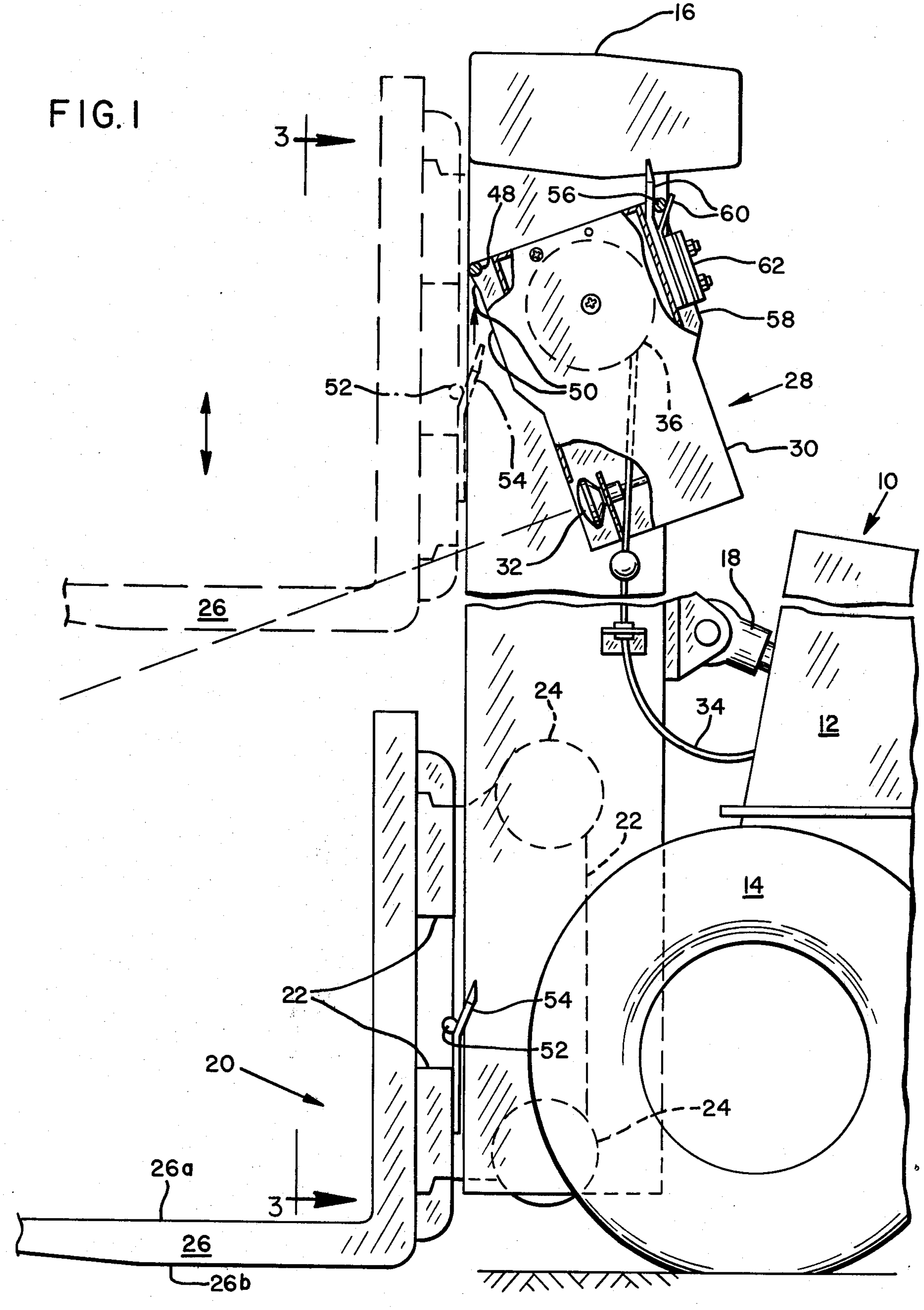
FIG. 1 is a partial extended side view of a lift truck having a mast, load carriage and load forks and showing the position of the light assembly when supportably mounted on the mast while the load carriage is in a lowered position.

With reference to FIG. 1, a lift truck designated generally as 10 is partially shown comprising a main frame 12 mounted upon traction wheels such as 14 and having a vertically-extending load-lifting mast with an outer section 16 pivotally attached at the bottom thereof to the frame 12 so as to be capable of tilting forwardly and rearwardly in response to the extension or retraction of a hydraulic tilt cylinder, the rod portion of which is shown as 18. Normally one or more vertically-extensible inner mast sections such as 17 (FIGS. 2 and 3) are mounted telescopically within the outer section 16. Mounted upon the inner mast section 17 and vertically movable with respect thereto is a load-handling device designated generally as 20 which, in the embodiment shown, comprises a load carriage 22 with rollers 24 for permitting vertical movement with respect to the inner section 17, and transversely spaced, forwardly-extending load-engaging members comprising load forks such as 26 mounted thereon (only one of which is shown). Each load fork 26 has an upwardly-facing load-engaging surface 26*a*, a bottom surface 26*b*, and a forward end or tip 26*c* (FIG. 2).

A light assembly designated generally as 28 is provided comprising a housing 30 in which is mounted a light source 32 which is preferably a reflector bulb capable of projecting light forwardly in a generally conical pattern. The light bulb 32 is energized through an electrical conduit 34 which can be extended from or retracted into a spring-biased retracting reel 36 rotatably mounted within the housing 30. The conduit 34 is electrically coupled through a revolving connector 38 and electrical conduits 40, 42 and 44 (FIG. 4) to the bulb 32. A variable resistor 46 is interjected between lines 40 and 42 to compensate for different electrical voltages of the lift truck 10, which vary depending upon the particular battery equipment (not shown) utilized in the truck from which the conduit 34 draws its power. It will be appreciated that the provision of the reel 36 permits a wide range of vertical travel of the light assembly 28 for purposes to be described hereafter.

The primary purpose of the light assembly is to aid the operator in the manipulation of the load-handing device (e.g. the carriage 22 and forks 26) at positions thereof which are elevated above the operator. This is accomplished by mounting the light assembly 28 upon the load-handling device, as shown in solid lines in FIG. 2, and in particular on the carriage 22, such that the light source 32 is adjacent to the bottom of the load-handling device and rearwardly of the forward end 26*c* of the load-engaging member such as 26. In particular, when the load-engaging member is a fork such as 26 having an upwardly-facing load-engaging surface 26*a*, the light source should be at a level below that of the upwardly-facing surface 26*a* so as not to be blocked by any load thereon. Preferably, the light source 32 is at the same level as, or slightly below, the bottom 26*b* of the load-engaging member and is positioned in a vertical plane which intersects the load-engaging member longitudinally such that the light source is either directly beneath, or preferably directly behind, the load-engaging member. In this position, with the light source projecting light in a generally conical pattern and in a generally forward direction, a portion of the light will be intercepted by the load-engaging member 26 so as to project a shadow of the load-engaging member forwardly against a load stack, which shadow is accurately indicative of the vertical elevation of the load-engaging member 26. When located rearwardly of the entire load-engaging member as shown in FIG. 2, the light assembly 28 is positioned transversely outwardly of the outer mast section 16.

Figure 2:
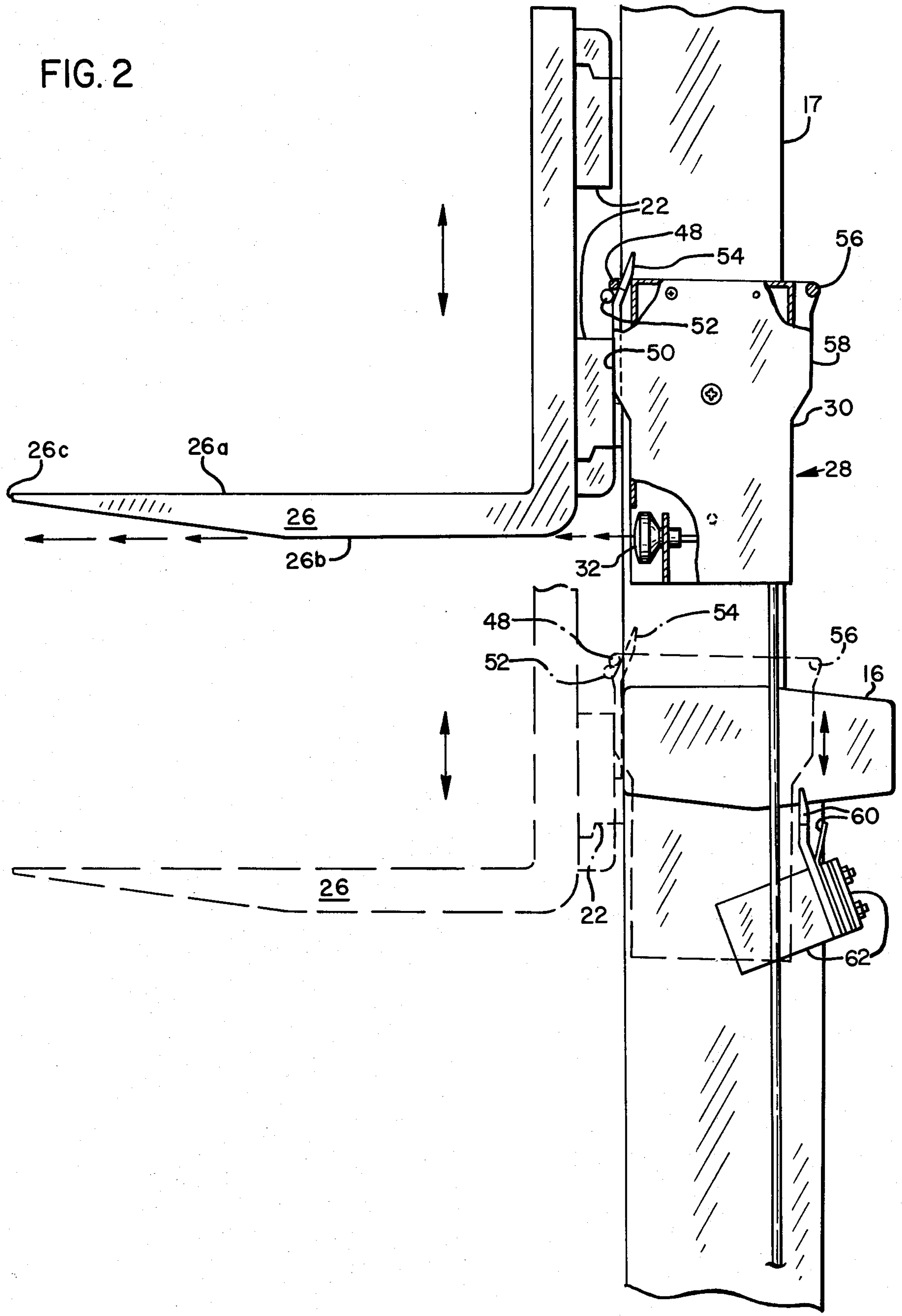
FIG. 2 is a partial side view showing the position of the light assembly of FIG. 1 when supportably mounted upon the load carriage while the carriage is in a raised position.

It should be appreciated that, while the position of the light source as depicted in FIG. 2, i.e. directly behind the load-engaging member 26 and at a level at or below the bottom of the load-engaging member, is considered to be the most advantageous, substantially equivalent results could be obtained by placing the light source in other positions adjacent the bottom of the load-handling device so as not to be blocked by the load, such as transversely to one side of the load-engaging member at an elevation below that of the upwardly-facing load-engaging surface 26*a*, and it is intended that such other equivalent positions be included within the scope of the invention.

Figure 4:
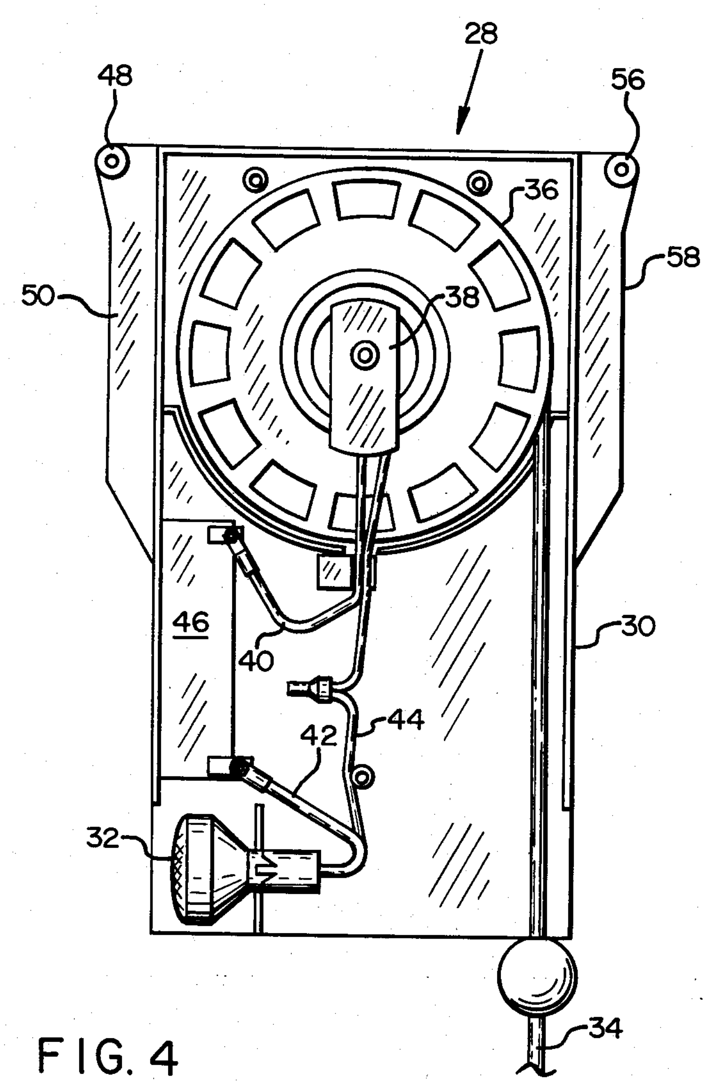
FIG. 4 is an interior side view of the light assembly taken along line 4—4 of FIG. 3.
Figure 3:
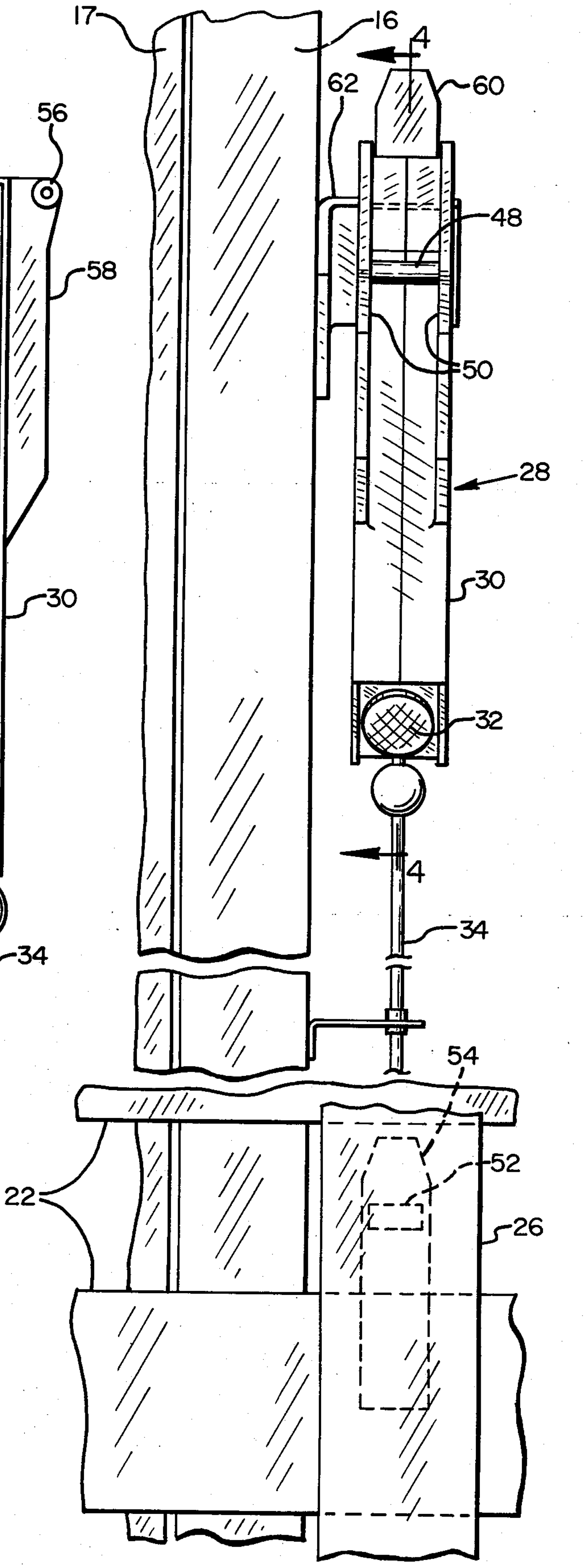
FIG. 3 is a partial front view taken along line 3—3 of FIG. 1.

It will be noted that, because of the low mounting position of the light assembly 28 on the carriage 22 so as to be effective in performance of the above-described elevation-indicating function, at least a portion of the light assembly extends downward to or below the bottom of the load-engaging member 26 as depicted in FIG. 2. To prevent damage to the light assembly when the carriage is lowered, the mounting structure by which the light assembly 28 is mounted to the carriage 22 permits upward movement of the light assembly 28 with respect to the carriage from the above-described operative low mounting position. With reference specifically to FIGS. 2–4, a horizontally-oriented crossbar 48 is provided at the upper forward corner of the light assembly 28 extending between a pair of transversely-spaced flanges 50. When the light assembly 28 is mounted upon the carriage 22, the crossbar 48 rests by force of gravity upon a transversely-oriented shoulder 52 of a carriage-mounted upwardly and rearwardly slanting support member 54 which fits loosely between the flanges 50. Thus it will be seen that the light assembly 28 may be lifted freely from the shoulder 52 and/or pivoted upwardly and rearwardly about the axis of the crossbar 48 (forward pivoting of the light assembly from the position shown in FIG. 2 is prevented by the abutment of the flanges 50 against the rearwardly-facing surfaces of the carriage 22).

Although the mounting of the light assembly 28 to the carriage 22 in such a way that the light assembly may move upward with respect to the carriage will lessen the chance of damage to the light assembly when the carriage is fully lowered, it is preferable that an additional mounting feature be utilized to further reduce the chance of damage to the light assembly and, at the same time, provide an additional function for the light assembly. The additional mounting feature involves a structure by which the light assembly 28 may be detached automatically from the load carriage 22 and attached to the outer mast section 16 in response to downward movement of the carriage 22 below a predetermined position or elevation. In this regard, it will be noted that a crossbar 56, similar to crossbar 48, is provided at the rear upper corner of the housing 30 between transversely-spaced flanges 58. An upwardly-opening support yoke 60, aligned behind the carriage support member 54 as shown in FIG. 3, is connected to the outer mast section 16 by a bracket 62 and fits loosely between the flanges 58 so that, upon downward movement of the carriage 22, the crossbar 56 becomes engaged with the yoke 60 when the carriage is at a predetermined elevation approximately level with the operator's horizontal line of sight. Upon further downward movement of the carriage the yoke 60 prevents further downward movement of the light assembly 28, and accordingly the forward crossbar 48 disengages from the carriage-mounted support member 54. Thus, when the carriage reaches its fully-lowered position as depicted in FIG. 1, the light assembly 28 is nowhere near ground level where it can be damaged by contact with the floor or other obstacles. Rather the light assembly is attached to the outer section 16 of the mast as shown in FIG. 1.

Moreover, the detachment of the light assembly 28 from the carriage 22 permits the light assembly to hang freely from the crossbar 56. Since the center of gravity of the light assembly 28 is horizontally forward of the crossbar 56 when the light assembly is vertical, the light assembly automatically assumes a downwardly-tilted position as shown in FIG. 1 so as to direct light more downwardly than when the light assembly was attached to the carriage 22. This enables the light to perform the additional function of illuminating the area in front of the lift truck when the carriage is lowered, to aid the operator in the manipulation of loads and provide traveling illumination for operation in dimly lit areas. The elevated position of the light assembly 28 when the carriage is lowered provides excellent illumination for these purposes even when a load is being carried upon the forks 26, since the light source 32 will normally be above the load thereby preventing any blockage of the light.

Upon movement of the carriage in an upward direction, the support member 54 once more engages the forward crossbar 48 when the carriage reaches a predetermined elevation and lifts the light assembly 28 from the yoke 60. Upon further elevation of the carriage, the light assembly 28 assumes its low (relative to the carriage), untilted position as shown in FIG. 2 for performance of its fork level indicating functions at higher carriage elevations.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a lift truck having a vertically-extending load-lifting mast for raising and lowering a load vertically, and a vertically-movable load-handling device mounted upon said mast having a load-engaging member thereon extending generally forwardly from said mast toward a forward end of said member, a positioning light assembly for said load-engaging member comprising light source means detachably mounted supportably upon said load-handling device so as to move vertically in unison therewith for projecting light in a generally forward direction, and first mutually cooperative means on said light source means and said mast for detaching said light source means from said load-handling device and attaching said light source means supportably to said mast in response to downward movement of said load-handling device below a predetermined elevation.

2. The apparatus of claim 1 further including second mutually cooperative means on said load-handling device and said light source means for detaching said light source means from said mast and attaching said light source means supportably to said load-handling device in response to upward movement of said load-handling device above a predetermined elevation.

3. The apparatus of claim 1 wherein said first mutually cooperative means includes means for attaching said light source means supportably to said mast in an attitude such that said light source means projects light in a different direction when attached supportably to said mast than when said light source means is mounted supportably upon said load-handling device.

4. The apparatus of claim 3 wherein said first mutually cooperative means includes means for attaching said light source means supportably to said mast in an attitude such that said light source means projects light in a more downwardly forward direction when attached supportably to said mast than when said light source means is mounted supportably upon said load-handling device.

5. The apparatus of claim 1 wherein said light source means, when mounted supportably upon said load-handling device, is at a position adjacent the bottom of said load-handling device.

6. The apparatus of claim 1 wherein said load-engaging member has an upwardly-facing load-engaging surface thereon, and said light source means, when mounted supportably upon said load-handling device, is at a level below that of said upwardly-facing surface.

7. The apparatus of claim 1 wherein said light source means, when mounted supportably upon said load-handling device, is at a level no higher than the bottom of said load-engaging member.

8. The apparatus of claim 1 wherein at least a portion of said light source means, when mounted supportably upon said load-handling device, depends below the bottom of said load-engaging member.

9. The apparatus of claims 1, 2, 3, 4, 5, 6, 7, or 8 wherein said light source means, when mounted supportably upon said load-handling device, is mounted at a position rearwardly of the forward end of said load-engaging member and projects light in a generally forward direction in which a portion of said light is intercepted by said load-engaging member so as to project a shadow of said load-engaging member.

10. In a mobile lift truck having wheels for driving said lift truck forwardly along a direction of travel, a lifting apparatus for raising and lowering a load vertically, and a load-handling device mounted for vertical reciprocation upon said lifting apparatus having a load-engaging member extending therefrom forwardly along said direction of travel and terminating in a forward end adapted for insertion into a predetermined space adjacent an elevated load in response to movement of said lift truck toward said load along said direction of travel, the improvement which comprises light assembly means for horizontally aligning said load-engaging member with said predetermined space preparatory to said insertion, said light assembly means comprising light source means located at a mounted position rearwardly of said forward end of said load-engaging member and adjacent to the bottom of said load-handling device at a predetermined vertical elevation with respect to said load-engaging member for projecting light forwardly substantially horizontally along said direction of travel of said lift truck such that a portion of said light is intercepted by said load-engaging member and for thereby projecting a shadow of said load-engaging member substantially horizontally along said direction of travel of said lift truck, and light source mounting means attaching said light source means to said load-handling device at said mounted position for causing said light source means to reciprocate vertically in unison with the vertical reciprocation of said load-handling device and load-engaging member while maintaining said light source means at said predetermined vertical elevation with respect to said load-engaging member during said vertical reciprocation.

11. The apparatus of claim 10 wherein said light source mounting means includes means responsive to vertical reciprocation of said load-handling device relative to a predetermined height for moving said light source means from said mounted position to a more elevated position relative to said load-handling device in response to downward movement of said load-handling device below said predetermined height and for moving said light source means from said elevated position to said mounted position in response to upward movement of said load-handling device above said predetermined height.

12. The apparatus of claim 11 wherein said light source mounting means includes means for tilting said light source means downwardly in response to said downward movement of said load-handling device below said predetermined height.

13. The apparatus of claim 11 wherein at least a portion of said light source means depends below the bottom of said load-engaging member when said light source means is in said mounted position, and wherein no portion of said light source means depends below the bottom of said load-engaging member when said light source means is in said elevated position relative to said load-handling device.

14. The apparatus of claim 10 wherein said light source means at said mounted position is substantially no higher than the bottom of said load-engaging member.

15. The apparatus of claim 10 wherein said load-engaging member has an upwardly-facing load-engaging surface thereon and said light source means at said mounted position is at a level below that of said upwardly-facing surface.

16. The apparatus of claim 10 wherein said light source mounting means includes means detachably mounting said light source means supportably upon said load-handling device, further including first mutually-cooperative means on said light source means and said lifting apparatus for detaching said light source means from said load-handling device and attaching said light source means supportably to said lifting apparatus in response to downward movement of said load-handling device below said predetermined height.

17. In a mobile lift truck having wheels for driving said lift truck forwardly along a direction of travel, a lifting apparatus for raising and lowering a load vertically, and a load-handling device mounted for vertical reciprocation upon said lifting apparatus having a load-engaging member extending therefrom forwardly along said direction of travel and terminating in a forward end adapted for insertion into a predetermined space adjacent an elevated load in response to movement of said lift truck toward said load along said direction of travel, the improvement which comprises light assembly means for aligning said load-engaging member with said predetermined space preparatory to said insertion, said light assembly means comprising light source means located at a mounted position rearwardly of said forward end of said load-engaging member and at a predetermined vertical elevation with respect to said load-engaging member for projecting a shadow of said load-engaging member forwardly, and light source mounting means attaching said light source means to said load-handling device at said mounted position for causing said light source means to reciprocate vertically in unison with said load-handling device and load-engaging member while maintaining said light source means at said predetermined vertical elevation with respect to said load-engaging member, said light source mounting means including means responsive to vertical reciprocation of said load-handling device with respect to a predetermined height for moving said light source means from said mounted position to a more elevated position relative to said load-handling device in response to downward movement of said load-handling device below said predetermined height and for moving said light source means from said elevated position to said mounted position in response to upward movement of said load-handling device above said predetermined height.

18. The apparatus of claim 17 wherein said light source mounting means includes means detachably mounting said light source means supportably upon said load-handling device, further including first mutually-cooperative means on said light source means and said lifting apparatus for detaching said light source means from said load-handling device and attaching said light source means supportably to said lifting apparatus in response to said downward movement of said load-handling device below said predetermined height and for detaching said light source means from said lifting apparatus and attaching said light source means supportably to said load-handling device in response to upward movement of said load-handling device above said predetermined height.

* * * * *

UNITED STATES PATENT AND TRADEMARK OFFICE

CERTIFICATE OF CORRECTION

PATENT NO. : 4,224,657

DATED : September 23, 1980

INVENTOR(S) : John E. Olson

It is certified that error appears in the above-identified patent and that said Letters Patent are hereby corrected as shown below:

ABSTRACT, line 21 Change "is" to --it--.

Col. 1, line 13 Change "provide" to --provides--;

line 53 Change "3,122,957" to --4,122,957--.

Signed and Sealed this

*Second* Day of *June 1981*

[SEAL]

*Attest:*

RENE D. TEGTMEYER

*Attesting Officer* *Acting Commissioner of Patents and Trademarks*